United States Patent [19]

Enders

[11] 4,302,274
[45] Nov. 24, 1981

[54] TIRE BUILDING MACHINE

[75] Inventor: George E. Enders, Salem, Ohio

[73] Assignee: NRM Corporation, Akron, Ohio

[21] Appl. No.: 122,605

[22] Filed: Feb. 19, 1980

[51] Int. Cl.³ ............................................ B29H 17/24
[52] U.S. Cl. ...................................... 156/401; 92/92;
152/350; 156/132; 428/35
[58] Field of Search ................... 156/120, 132, 123 R, 156/401, 416; 92/92, 103 R, 103 F; 428/35, 65; 152/349, 350

[56] References Cited

U.S. PATENT DOCUMENTS

| | | | |
|---|---|---|---|
| 2,666,007 | 1/1954 | Hovey | 156/120 |
| 3,305,427 | 2/1967 | Rehman | 156/401 |
| 3,560,301 | 2/1971 | Cantarutti | 156/401 |
| 3,966,536 | 6/1976 | Schmitt | 156/132 |
| 4,011,127 | 3/1977 | Eichholz et al. | 156/401 |
| 4,087,306 | 5/1978 | Head et al. | 156/401 |

Primary Examiner—John E. Kittle
Attorney, Agent, or Firm—Maky, Renner, Otto & Boisselle

[57] ABSTRACT

A tire building machine has a dual bladder ply turn-up mechanism including radially inner and outer annular bladders mounted on a radially stepped annular support. Each bladder is fully contour molded and has imbedded in its radially inner wall a plurality of circumferentially spaced flanged inserts adapted for connecting and positioning the bladder on the support. Each bladder further includes position stabilizers in the form of inelastic cinch bands which include openings through which the inserts extend and the outer bladder may also include an annular girdle to improve bladder rolling characteristics. Also provided is a one-piece manifolded bladder support which includes a radially stepped cylindrical support surface for the bladders and internal porting means for bladder inflation.

45 Claims, 23 Drawing Figures

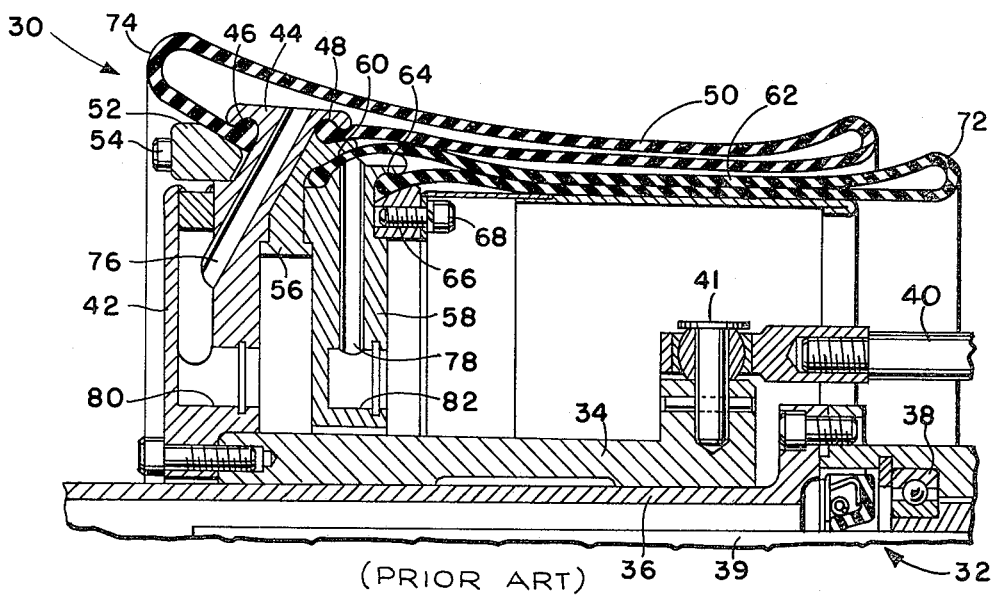
FIG. 1 (PRIOR ART)
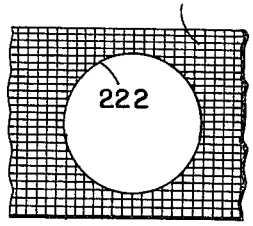
FIG. 16
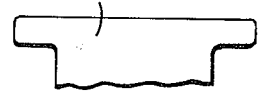
FIG. 17
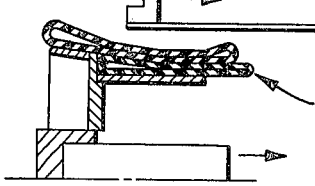
FIG. 18
FIG. 6
FIG. 7
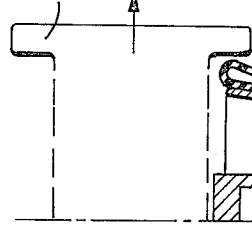

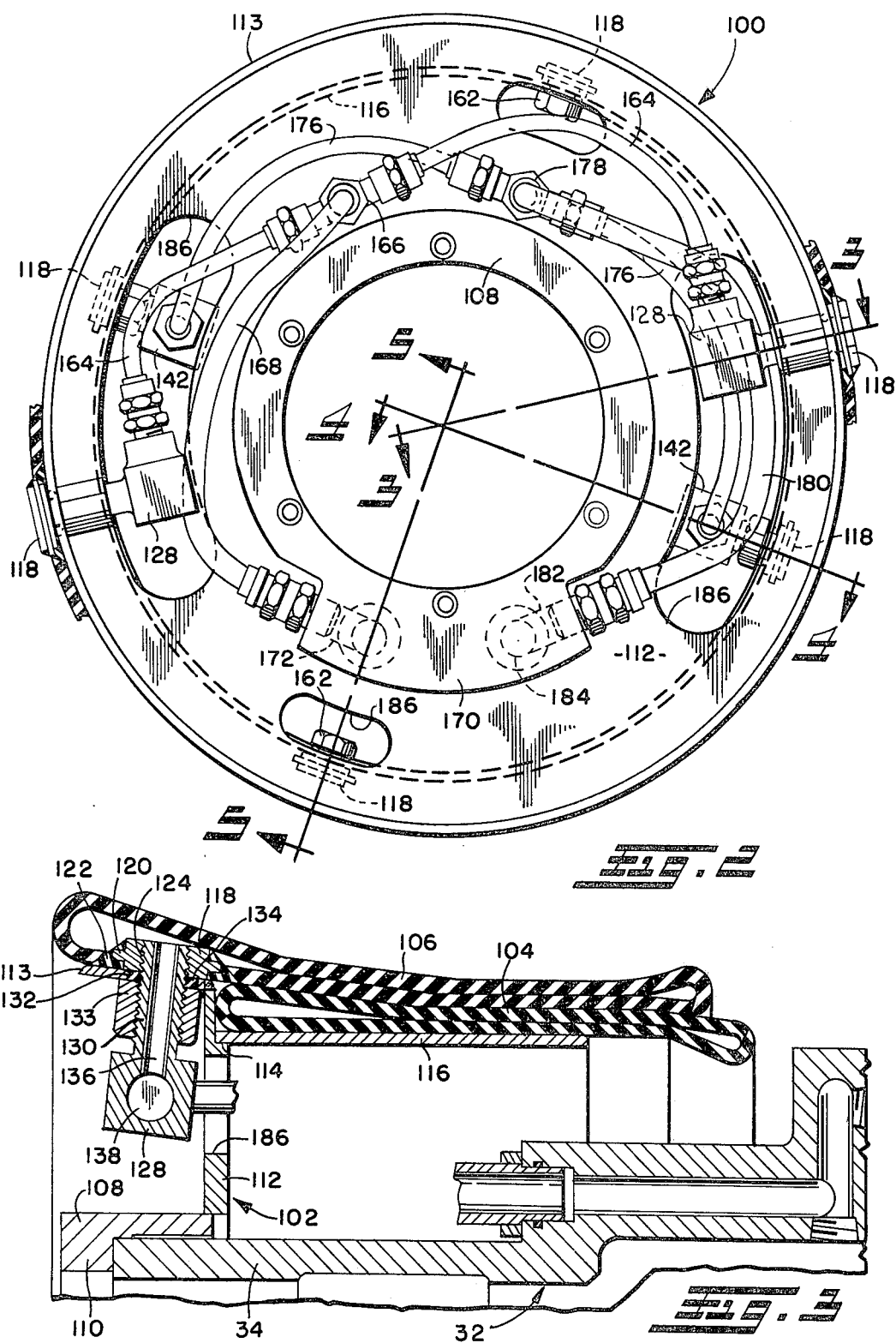

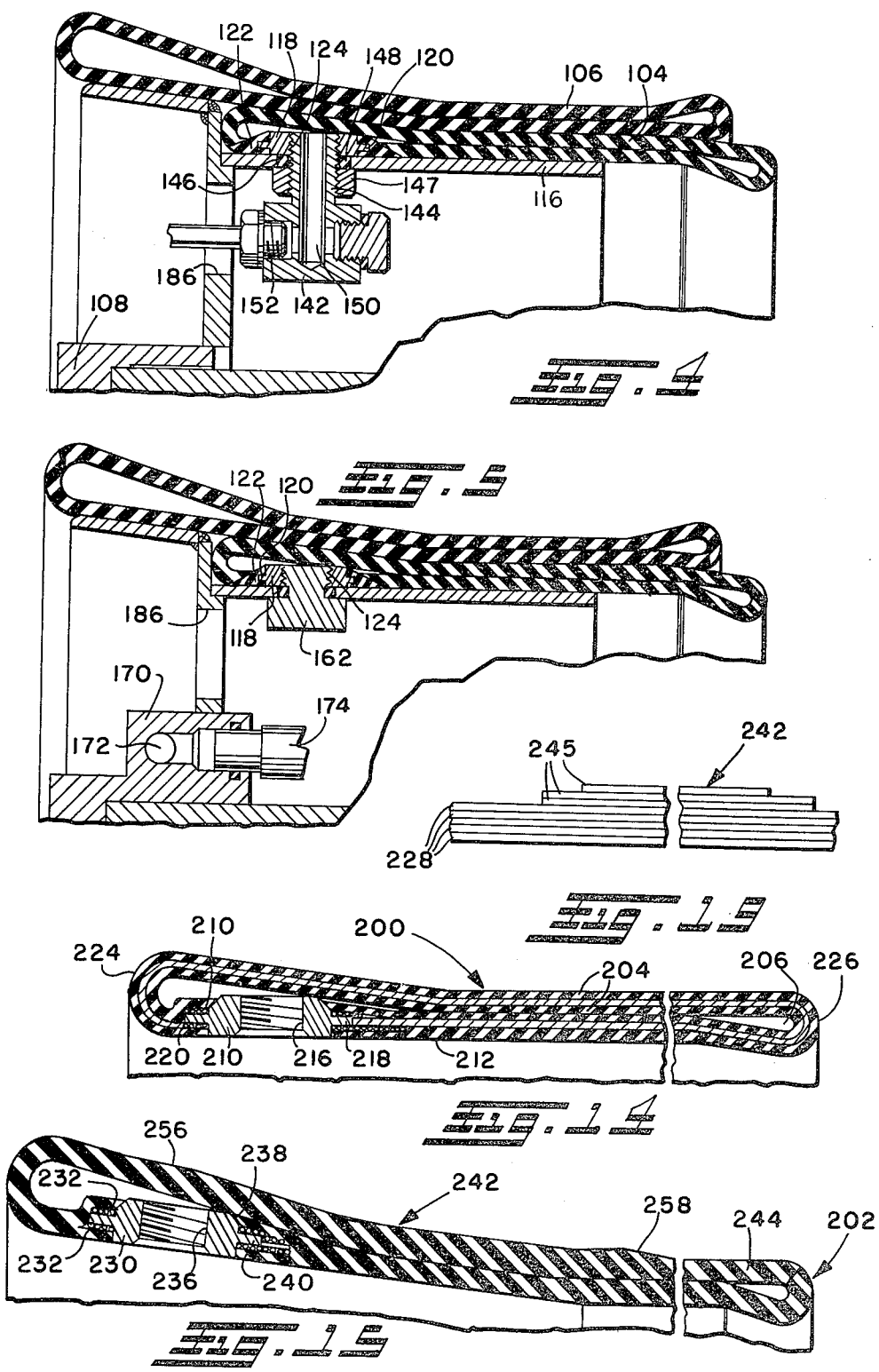

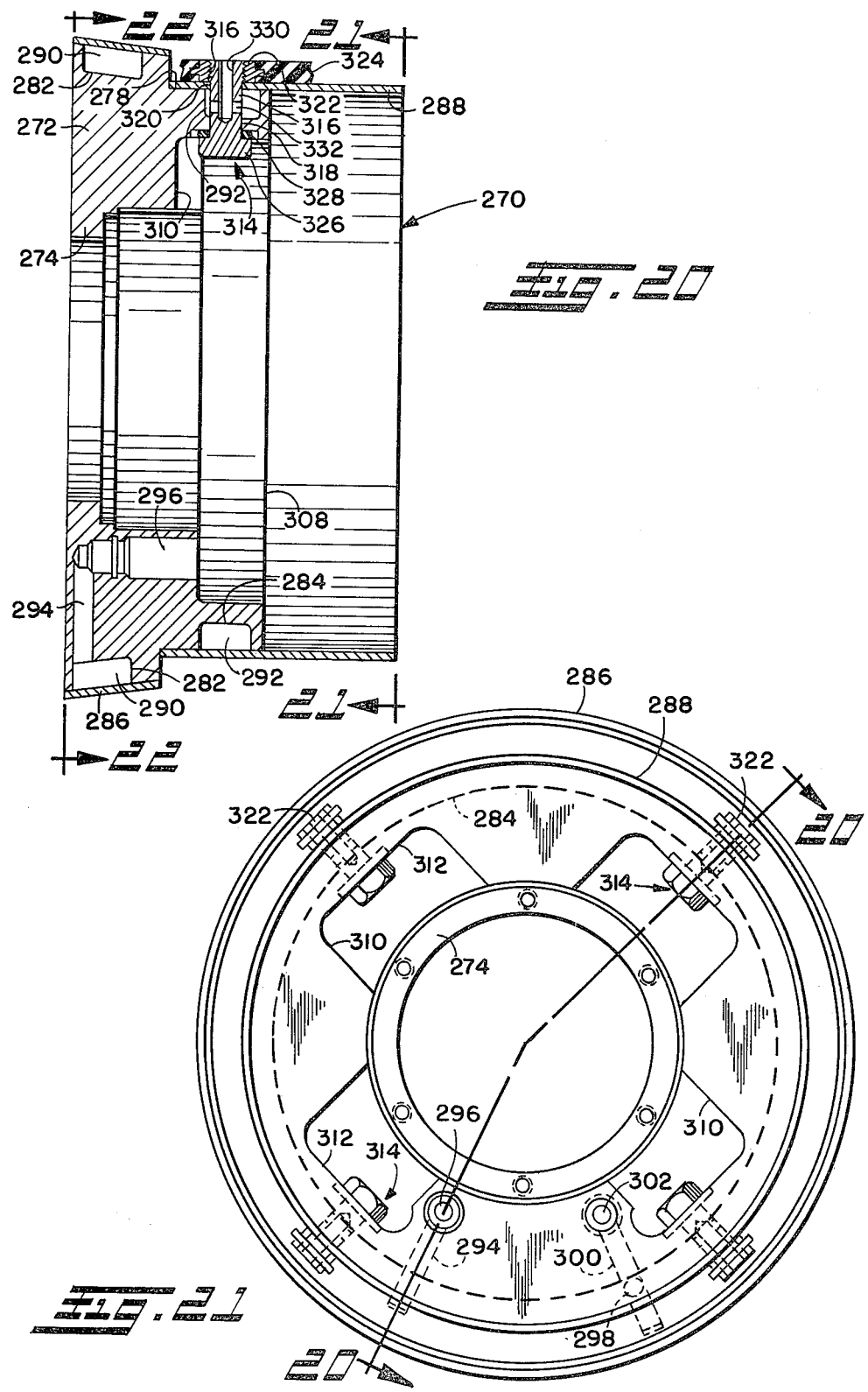

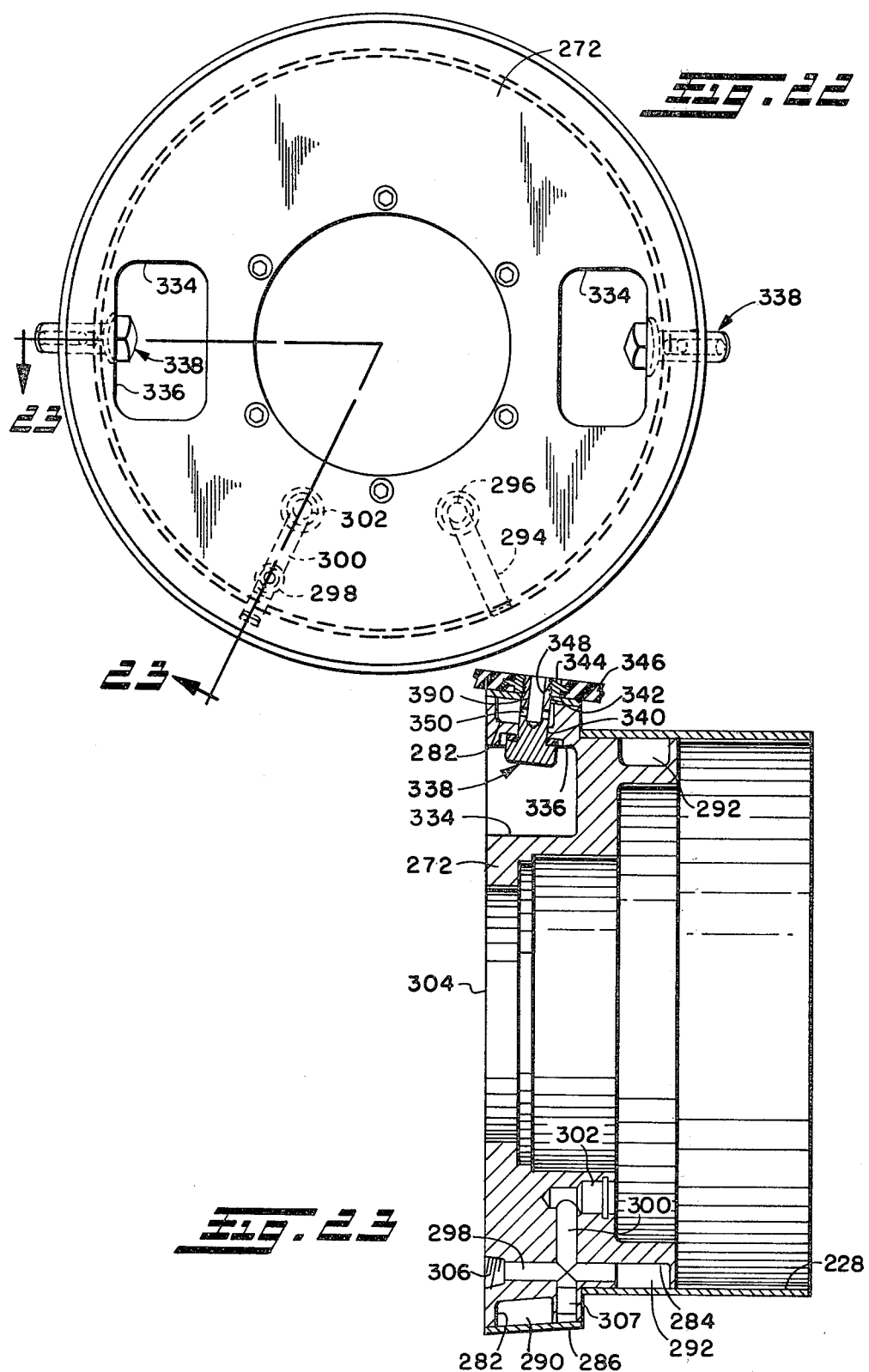

TIRE BUILDING MACHINE

BACKGROUND OF THE INVENTION

This invention relates generally to a tire building machine employing ply turn-up mechanisms or the like operatively associated with a tire building drum, and more particularly to such mechanisms which incorporate inflatable bladders to turn the edges of plies at the drum shoulders over onto themselves to encase inextensible bead rings previously positioned at the shoulders.

Many tire building machines presently in use include ply turn-up mechanisms incorporating one or two expansible cooperating air bags or bladders which when brought into proper position at the end of a tire building drum and inflated cause the previously turned down ply material to be turned about a previously set bead pressed firmly into place. Such bladders are mounted on and supported by cylindrical support can assemblies or the like which may be indexed axially to and from the drum during the tire building process.

Most bladders used in dual bladder turn-up mechanisms are made of cord reinforced elastomeric material and include an annular outer wall portion, one or both axial ends of which are turned axially inwardly to form a pair of inner wall portions. The inner wall portions of each bladder terminate in annular mounting flanges which secure the bladder to the support can assembly. When installed, the flanges normally are offset to accommodate suitable air passages in the support can assembly for inflating the bladder. For an example of such a dual bladder turn-up mechanism, reference may be had to U.S. Pat. No. 3,560,301.

While such general type of bladders has been fairly satisfactory in performance, some problems exist in connection therewith. For example, the bladders may be securely locked in position during the turn-up operation; however, removal and replacement of the bladders heretofore has been a time consuming project. To mount the bladders, the support can assemblies have been of complicated construction usually requiring a plurality of mounting rings and plates which interfit in jigsaw puzzle-like manner to retain therebetween the bladder flanges. Moreover, proper placement and alignment of the bladder flanges has been difficult to obtain, and if misaligned, damage may result to the bladder. Also, desired circular expansion of the bladders often has been inhibited by the bladder and support can assembly constructions.

In an effort to eliminate the bladder flanges and complex means for mounting same, other types of bladders have been devised which are fully and continuously annularly molded. Such types of bladders have been provided with some form of mounting means such as integrally formed profiled mounting rings which fit in similarly profiled grooves in the support can assembly. An example of this type of bladder can be seen in U.S. Pat. No. 4,087,306. Other bladders have employed fittings or valves molded directly into the bladders to which air supply tubing may be connected. An example of this type of bladder can be seen in U.S. Pat. No. 3,305,427.

One drawback of these types of bladders is that the bladders are subject to distortion as the bladders are not securely locked or held to the support can assembly completely around its circumference. While the fittings or valves secure the bladder to the support can assembly at spaced-apart locations, the bladder is subject to serpentining, i.e., axial movement and/or lifting of the bladder from the support can assembly intermediately of the fittings, due to the substantial axial and radial shear forces developed during ply turn-up thereby destroying the uniform annular shape of the bladder as the same is expanded. Accordingly, uneven forces are applied to the folded ply edges which is undesirable. In addition, high bladder pressures required to obtain the desired forces acting to turn and stitch the tire plies result in high energy costs and short bladder life. Moreover, those bladders employing fittings or valves may be subject to early failure at the fittings or valves.

Regardless of the type of bladder employed, another drawback of many dual bladder turn-up mechanisms is the entanglement of hosing and cross-connections required to supply inflating air or other media to and from the bladders. Such plumbing connections unduly add to the complexity of the tire building machine and the cost thereof.

In view of the foregoing, it is a principal object of this invention to provide an improved bladder construction which eliminates many of the problems heretofore associated with known bladders and support can assemblies therefor. It is another object to provide an annular bladder support which mounts in a tire building machine as a complete assembly without internal tubing and cross-connections therefor. It is still another object to provide a dual bladder turn-up or like mechanism wherein the radially outer bladder achieves an essentially circular condition but for the radially inner bladder. Yet another object of the invention is to provide a bladder construction having improved rolling characteristics and which requires less air pressure to do the same amount of work thereby resulting in greater energy efficiency and longer bladder life.

It is a further principal object to provide an improved dual bladder turn-up for replacing existing turn-ups in new or retrofitted tire building machines of the type sold by applicant's assignee under the model designation "88 TBM".

SUMMARY OF THE INVENTION

According to this invention, an improved dual bladder turn-up mechanism is provided which provides desirable and advantageous results heretofore unattainable in known tire building machines. In particular, a novel bladder construction is taught which comprises a contour, fully molded annular inflatable bladder having imbedded therein a plurality of annularly spaced inserts for connecting and axially positioning the bladder in the turn-up. The bladder further has imbedded therein one or more inelastic stabilizers or cinch bands extending in a direction perpendicular to the bladder axis for controlled shaping of the bladder such that the bladder when inflated tends to form a circle tangential to the cinch bands. The cinch bands may be metal bands or preferably may be square woven bands of nylon fabric and have a plurality of openings therein through which the inserts project. Two cinch bands may be provided and the inserts may each have a projecting flange fitted between radially spaced portions of the bands or on top of the bands for interlocking and holding the insert in the molded bladder against pull-out. The radially outer bladder in the dual bladder mechanism may further be provided with a thickened girdle at its radially outer wall to cause the bladder to roll.

The radially inner and outer bladders of the turn-up may be mounted respectively on the radially inner and outer steps of a one-piece radially stepped annular support which has circumferential air ducts respectively radially underlying each step. A plurality of fastener fittings are provided for securing and locating the bladders on their respective steps, the fittings extending into the respective ducts and having a fluid passage therein establishing fluid communication between the bladders and respective ducts. Each duct may be formed by a circumferential groove in its respective step which is closed to form the duct by a metal band fitted over the groove to close same.

With the bladders connected and axially located on the annular support by the respective inserts and fittings, the annular support may be axially moved to a position with the bladders underlying the edge of a tire building drum when deflated. The bladders are then inflated in sequence to achieve a circular condition tangent to the cinches, the outer bladder but for the drum and plies being turned and the inner bladder but for the outer bladder to cause the outer bladder to wrap and tightly stitch the plies around the bead. Because of the cinch bands, resultant bladder forces are towards the bead bundle or edge face of the drum so that significantly less air pressure such as 25% to 50% less is required to obtain the desired turning and stitching forces. Accordingly, bladder life is increased and overall energy efficiency of the machine is improved.

To the accomplishment of the foregoing and related ends the invention, then, comprises the features hereinafter fully described and particularly pointed out in the claims, the following description and the annexed drawings setting forth in detail certain illustrative embodiments of the invention, these being indicative, however, of but a few of the various ways in which the principles of the invention may be employed.

BRIEF DESCRIPTION OF THE DRAWINGS

In the annexed drawings:

FIG. 1 is a fragmentary longitudinal section through a tire building machine employing a prior art turn-up mechanism which turn-up may be readily replaced by the turn-up according to this invention;

FIG. 2 is an end elevation of a dual bladder turn-up mechanism constructed in accordance with the invention;

FIGS. 3-5 are fragmentary longitudinal sections through the turn-up mechanism of FIG. 2 taken respectively along the lines 3—3, 4—4 and 5—5 thereof;

FIGS. 6-13 are schematic diagrams showing a typical turn-up operation at one end of a tire building drum employing the turn-up of the present invention;

FIGS. 14 and 15 respectively are fragmentary longitudinal sections through preferred radially inner and outer bladders embodying a pair of radially spaced cinch bands and inserts according to the invention;

FIG. 16 is a fragmentary plan view of the cinch band of FIGS. 14 and 15 showing one of the insert holes provided therein;

FIGS. 17 and 18 are fragmentary longitudinal sections through a bladder illustrating alternative arrangements of the cinch bands;

FIG. 19 is an enlarged fragmentary longitudinal section through the outer wall of the outer bladder of FIG. 15 showing the thickened integral girdle prior to vulcanizing;

FIG. 20 is a longitudinal section through a preferred form of bladder support can constructed according to the invention;

FIG. 21 is an end elevation of the support can of FIG. 20 as seen from the line 21—21 thereof;

FIG. 22 is an end elevation of the support can of FIG. 20 as seen from the line 22—22 thereof; and FIG. 23 is a longitudinal section through the support can of FIG. 22 taken along the line 23—23 thereof.

PRIOR ART—FIG. 1

Figure 8:
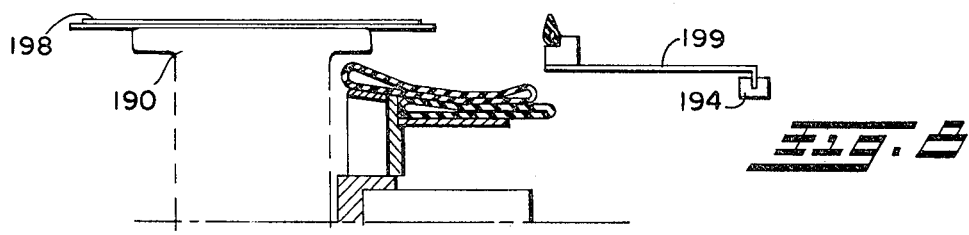

Referring now in greater detail to the drawings, FIG. 1 illustrates a portion of a ply turn-up mechanism 30 of conventional design manufactured and sold by applicant's assignee in conjunction with its tire building machine designated "88TBM". The turn-up is adapted to be mounted on the drum shaft assembly 32 of a tire building machine, there being provided a turn-up at opposite axial ends of the tire building drum. The shaft assembly shown includes an annular hub 34 axially slidably received on a shaft sleeve 36 which in turn is mounted for rotation by bearings 38 on the drum shaft 39. Axial movement of the hub 34 is obtained by actuation of a piston-cylinder assembly, only the piston rod 40 of which is shown connected to the hub by a ball and socket assembly 41. By actuating the piston-cylinder assembly, the hub 34 may be moved axially toward and away from the drum as required during the tire building operation.

Attached to the annular hub 34 adjacent the axially inner end thereof (to the left in FIG. 8) is a radially extending plate 42 of the ply turn-up 30. The plate 42 has an annular radial projection 44 of T-shape cross-section, the stem of which extends slightly axially outwardly (to the right in FIG. 1) as well as radially outwardly. The flanges of the T-projection 44 extend axially in opposite directions and terminate at radially inwardly projecting terminal ends which define annular grooves 46 and 48 in which are received the beads or flanges of an annular folded bladder 50. The axially inner bead of the bladder 50 is retained in the groove 46 by a wedge ring 52 secured to the radial plate 42 by suitable fasteners 54. The other or axially outer bead of the bladder 50 is retained in the other annular groove 48 by a clamp ring 56 positioned axially outwardly of the plate 42. The clamp ring 56 is secured in place in jigsaw puzzle-like manner between the plate 42 and a second axially outwardly disposed radial plate 58. The outer plate 58 forms with the clamp ring 56 a groove 60 for receipt and retention of the axially inner bead of a second bladder 62 disposed radially inwardly of the first bladder when deflated. The other bead of the inner bladder 62 is retained in an axially outwardly opening groove 64 in the outer plate 58 by another wedge ring 66 which is secured to the outer plate by suitable fasteners 68. The fasteners 68 also secure to the second plate an axially outwardly extending bladder support cylinder or can 70.

As seen in FIG. 1, the inner bladder 62 when deflated lies substantially flat having a fold 72 at its axially outer edge and is supported over substantially its entire length by the cylinder 70. The outer bladder 50 when deflated lies substantially flat over the second bladder 62. The outer bladder 50, which also is folded at its axially outer edge, further has a folded or looped inner marginal portion 74.

Such prior art bladders are commonly molded in flat strips with the beads formed along the longitudinal edges of the strips. The strips are then spliced to form rings which are then folded as shown in FIG. 1 and secured at their beads to form closed expansible bladders.

To inflate the expansible bladders 50 and 62, the radial plates 42 and 58 are provided respectively with radial air passages 76 and 78 opening outwardly to the interior bladder cavities for delivery of pressurized air. The air passages 76 and 78 may terminate respectively at their inner ends at axial bores 80 and 82 in the plates 42 and 58 which bores are adapted to receive therein suitable fittings for coupling thereto respective air supply tubes (not shown) of the tire building machine.

Although the foregoing ply turn-up has proven satisfactory in use, it can now be seen that a plurality of specially machined and complex parts are required for mounting, locating and supporting the folded bladders. Not only are the parts difficult and expensive to manufacture, assembly and disassembly of the rings and plates is time consuming and often results in improper fitting of the bladder beads in their grooves leading to leaks and/or damage to the bladders. Moreover, the inner bladder 62 cannot assume a circular shape as may be desired because of the interference presented by the mounting assembly for the outer bladder. Accordingly, it would be desirous and advantageous to provide a ply turn-up to replace and improve over such known turn-up in new tire building machines as well as retrofit existing tire building machines.

Although the invention is directed to improvements over the aforedescribed turn-up and retrofitting of existing tire building machines, the same is not intended to limit the scope of this invention as the principles thereof may be applied advantageously in other types of tire building machines such as in other ply turn-ups or in belt folding machines.

DESCRIPTION OF THE PREFERRED EMBODIMENTS

The Ply Turn-Up (FIGS. 2–5)

Referring now to FIGS. 2–5, a dual bladder ply turn-up mechanism according to the invention is generally designated by reference numeral 100 and comprises a fabricated bladder support can 102 and inner and outer bladders 104 and 106 mounted thereon. The support can 102 includes a hub sleeve 108 having a radial flange 110 adapted to be mounted on the annular hub 34 of the shaft assembly 32. The hub sleeve 108 extends axially outwardly over the hub 34 and has mounted thereon a radially extending plate 112. Secured to the radially outer end of the plate 112 is an axially extending outer support ring 113 concentric with the plate which ring defines an outer step support and mounting surface for the outer bladder 106. The ring may be cylindrical or slightly conical as shown. The radial plate 112 on its axially outer face further includes an annular ledge 114 about which is concentrically mounted a cylinder 116 which extends axially outwardly from and concentrically with the radial plate 112. The cylinder 116 provides an inner step support and mounting surface for the inner bladder 104 which radially underlies and supports when deflated the outer bladder 106. As best seen in FIG. 3, the cylinder 116 is radially inwardly offset from the outer ring 113 such that the outer bladder 106 when deflated will be substantially flat over its length.

Both bladders 104 and 106 are fully contour molded into annular tubes and include at least one, but preferably a plurality of molded-in circular metal inserts 118 circumferentially spaced in line around the tube I.D. As best seen in FIGS. 3–5, each insert 118 is provided with a peripheral projecting flange 120 which during the molding process is integrally molded into a rubber seal pad 122 which in turn is integrally molded into the I.D. wall of the bladder. The thusly imbedded insert flange 120 serves to lock the insert securely in the I.D. wall of the bladder. Each insert 118 further has an internally threaded radial bore 124 for securing and positioning the bladder to the fabricated support can 102 and for inflating the bladder.

In FIG. 3, the outer bladder 106 is seen secured to the outer ring 113 of the support can 102 by live fitting 128 which has an externally threaded radial projection 130 extending through a corresponding locating and positioning hole 132 in the outer ring 113 into threaded engagement with the bladder insert 118. A nut 133 previously threaded on the projection 130 is tightened against the underside of the outer ring to hold the fitting and bladder in place. An O-ring seal 134 or the like is provided to seal the threaded connection against leakage. The fitting 128 is further provided with a radial air passage 136 in its radial projection opening at one end to the interior of the bladder and terminating at its other end to an axial bore 138 adapted to receive a supply tube fitting for connection to the supply tubing of the turn-up in the below described manner.

Similarly, in FIG. 4, the inner bladder 104 is seen secured to the cylinder 116 of the support can 102 by live fitting 142 which has an externally threaded radial projection 144 extending through a locating and positioning hole 146 in the cylinder into threaded engagement with the bladder insert 118 and nut 147 securing the fitting and bladder in place. A seal 148 may be provided to seal the threaded connection against leakage. The fitting 142 is further provided with radial air passage 150 terminating at lateral bore 152 which is adapted to receive a supply tube fitting.

Referring now to FIG. 5, the inner bladder 104 may further be secured to cylinder 116 by blind fittings 162 which are similar to the other fittings except that no provision is made for delivery of pressurized air therethrough. Instead, the blind fitting 162 plugs the insert bore 124 and serves only to locate and secure the bladder to the inner ring. In like manner to the other fittings, a seal 154 may be provided to seal the threaded connection.

Reverting to FIG. 2, it can now be seen that the outer bladder 106 is provided with two diametrically spaced inserts 118 whereat the bladder is secured to the outer ring 113 by live fittings 128. Additional inserts 106 and corresponding fittings 128 may be provided if desired particularly for larger tire sizes. The fittings 128 and inserts 118 cooperate to position and locate properly the outer bladder 106 and to secure the bladder against axial and radial shear forces which occur during the turn-up operation. Inflation of the outer bladder is effected by delivering air under pressure to the live fittings 128 by branch supply tubes 164 respectively connected at one end to the fittings 128 and at their other ends to branching connection 166 which preferably is equally spaced between the fittings for uniform delivery of inflating air. The branching connection 166 in turn is connected by common supply tube 168 to ducted boss 170 on the hub sleeve 108. The boss 170 includes a duct 172 therein for connecting tube 168 to the main supply tube 174 of the tire building machine as best seen in FIG. 5.

Still referring to FIG. 2, it can be seen that the inner bladder 104 is provided with four or more equally circumferentially spaced inserts 118 therein whereat the bladder is secured to the cylinder 116 by alternating live fittings 142 and blind fittings 162. The additional blind fittings are preferred to secure better the inner bladder against the substantial axial and radial forces that develop during the turn-up operation. To effect inflation of the inner bladder, the live fittings 142 are connected by branch supply tubes 176 to branch connection 178 which in turn is connected by common supply tube 180 to the ducted boss 170. The ducted boss is provided with a second duct 182 therein for connection to the main supply line 184 of the tire building machine. As seen in FIGS. 2–5, the radial plate 112 has openings 186 therein for passage of the branch supply tubes 176 and for facilitating tightening of the several fittings and nuts therefor.

It can now be appreciated that there is provided a ply turn-up that may be readily accommodated in conventional tire building machines. The turn-up may be easily mounted on known shaft assemblies and easily coupled to the existing air supplies of known tire building machines.

Operation (FIGS. 6–13)

The operational cycle of a tire building machine employing the turn-up of this invention is perhaps best understood by referring to the sequence of views of FIGS. 6–13 with the tire building drum 190 seen in its initially collapsed condition and the turn-up 100 indexed axially away from the drum along with a bead setting device 192 and ply turn-down device 194 in FIG. 6. Since the same parts are associated with both ends of the drum 190, only those parts associated with the right end of the drum are shown. It should also be pointed out that neither the drum per se nor the bead setter 192 and ply turn-down 194 forms any part of the invention and accordingly the construction and operation thereof will not be described in detail. For a detailed discussion of these components, reference may be had to U.S. Pat. No. 3,560,301.

With the tire building machine in the FIG. 6 position, a bead ring 196 may be placed upon the inboard side of the bead setter 192 and then the drum 190 expanded as shown in FIG. 7. The turn-up 100 may now be indexed axially towards the drum into position with the axially inner end of the outer bladder 106 located radially inwardly of the drum shoulder.

One or more plies 198 of tire fabric may now be applied circumferentially around the drum, portions of which overhang the end of the drum 190 substantially as shown in FIG. 8. The ply-down 194 is now indexed axially into position, the ply down fingers 199 thereof being in their elevated position overlapping the overhanging portions of the plies 198 as shown in FIG. 9.

Figure 9:
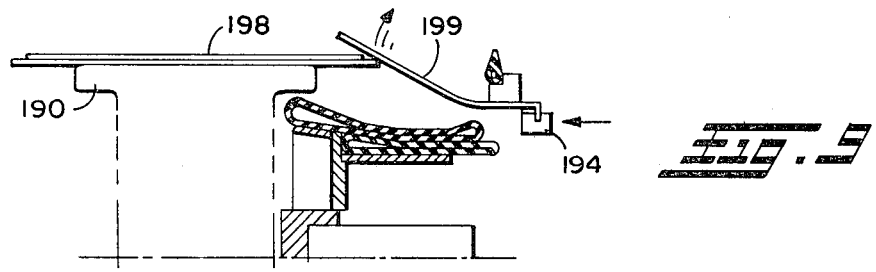
Figure 10:
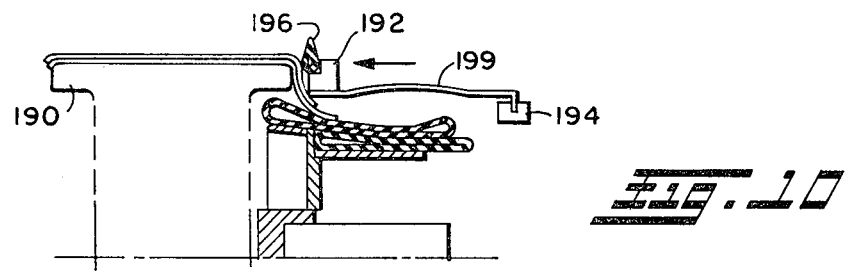

With the components in the FIG. 9 position, the bead setter 192 is indexed axially towards the drum 190 to move the bead ring 196 into position. As the bead setter moves inwardly toward the end of the drum, the same cammingly engages the ply down fingers 199 and causes the fingers to pivot radially inwardly thereby turning the plies over the end of the drum. As seen in FIG. 10, the plies have now been turned down and the bead ring has been set.

Figure 11:
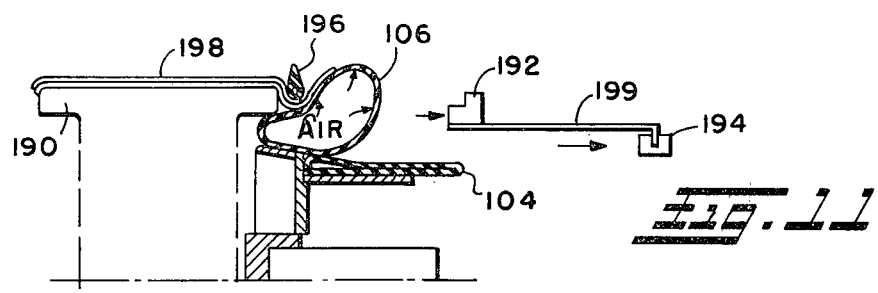
Figure 12:
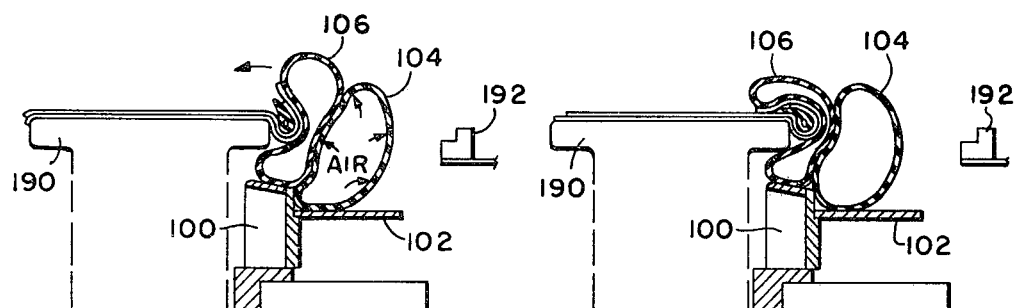
Figure 13:
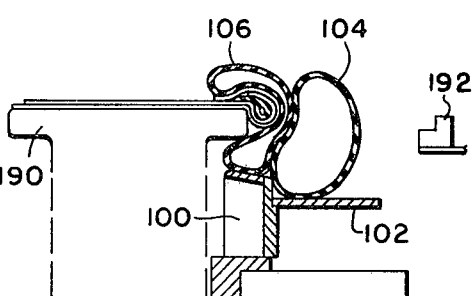

After the bead ring 196 is set and the plies turned down, the bead setter 192 and turn-down 194 are again indexed axially outwardly to their retracted position. At this time, air is supplied first to the outer bladder 106. Due to the bladder's tendency to form a circular form tangential to the bladder mounts at fittings 126, the plies are turned upwardly and tangentially wrapped around the bead ring 196 as shown in FIG. 11. After the outer bladder is substantially or fully expanded, it is then deflated partially as the inner bladder 104 is inflated to push or roll the outer bladder tangentially over the plies toward the drum 190 as indicated by the arrows in FIG. 12. When the inner bladder is fully inflated as seen in FIG. 13, the outer bladder will have turned up and stitched securely the plies about the bead rings and back upon themselves in a manner free of wrinkles and distortions.

At the completion of the turn-up operation, the outer bladder is reinflated and then both inner and outer bladders are deflated to lie flat against the support can 102. The turn-up 100 may now be retracted, subsequent tire building operations completed and the green tire carcass removed by collapsing the drum 190.

Modified Bladders (FIGS. 14–17)

Referring now to FIGS. 14 and 15, there are shown respectively preferred constructions of an inner bladder 200 and outer bladder 202 for use with higher pressures such as are required for example with biased constructed tires and truck tires. The inner bladder 200 shown in FIG. 14 is constructed of one or more plies 204 of unreinforced elastomeric material such as 50 durometer (+ or −5) Shore A gum rubber stock or neoprene which are wrapped around a mandrel and spliced to form a fully enclosed circular inflation chamber 206. For a harder bladder, 60 durometer (+ or −5) Shore A gum rubber stock or neoprene may be employed. The inner bladder is further provided with a cord reinforcement ply 208 with the cords therein extending axially thereby to resist radial expansion of the bladder during inflation while permitting the bladder to assume its inflated toroidal shape. For inflating and mounting purposes, at least one, but preferably four equally circumferentially spaced metal inserts 210 are incorporated in the radially inner wall 212 of the bladder such as in a manner similar to that shown and described above in connection with inner bladder 104. Each insert 210 extends radially about the thickness of the inner wall 212 and is chamfered at its radially outer end to prevent damage to the radially outer wall 214 of the bladder. The insert, which is internally threaded for mounting purposes at its central bore 216, has an annular projecting flange 218 imbedded between the bladder plies. There are also provided radially spaced stabilizers or cinch bands 220 imbedded in the radially inner wall 212 of the bladder between the plies thereof which bands extend perpendicular to the bladder axis, i.e., circumferentially around the bladder. The cinch bands 220 are located proximate or closely adjacent the metal inserts and as best seen in FIG. 16, and preferably include holes 222 therein through which the inserts extend with the flanges thereof retained between the thusly radially spaced cinch bands thereby to lock the insert in the bladder against pull-out. Each cinch band may be a metal or metal mesh band, but preferably, each cinch band is formed from square woven fabric seen in FIG. 16 made of rayon, nylon or metal wire such as steel, aluminum or copper wire. The fabric preferably has a tensile strength of about 600 lbs/sq. in./ply inch in the filler direction and 650 lbs/sq. in./ply inch in the warp direction. For example, 9 oz. nylon fabric may be employed. The fabric is aligned in the bladder with the cords thereof preferably aligned axially and circumferentially. The cinch bands may also be formed from other fabrics such as biased or continuous 90° cord whereby an essentially inextensible band is obtained.

Alternate cinch band arrangements are illustrated in FIGS. 17 and 18. In FIG. 17, one or two cinch bands 232a radially underlie the flanges 218a of insert fitting 210a while in FIG. 18, axially spaced annular cinch bands 232b are folded about the flanges 218b of the inserts 210b in which case the flanges 218b may be rectangular rather than circular for greater flange-band overlap.

The foregoing inner bladder construction is fully molded and vulcanized such as in a two-piece mold and then cured for example with steam and air under pressure to integrally join the plies 204 and bands 220, lock the metal insert 210 in place and to give the bladder a smooth exterior surface. Although the bladder is molded such that it will assume when inflated a circular condition symmetrical with the inserts, the bladder may be given a set so that upon deflation, it returns to its flattened condition with the bulk of the bladder lying to one side of the inserts 210 as shown in FIG. 14. That is, axially inner and outer folds or loops 224 and 226 respectively are set into the bladder so that the same will lie substantially flat as shown.

Reverting to FIG. 15, the outer bladder 202 can be seen to be of substantially like construction and formed similarly to the inner bladder 200, and includes elastomeric plies 228 (see FIG. 19), inserts 230, and cinch bands 232. In the case of the outer bladder, two inserts 234 spaced apart circumferentially 180° have been found to be satisfactory. However, more than two inserts preferably equally circumferentially spaced may be provided if desired particularly for larger tire sizes. Each insert has internally threaded bore 236, chamfered edge 238 and flange 240 projecting between the cinch bands 232. The outer bladder further preferably is provided with an annular thickened portion or girdle 242 on its outer wall 244 to cause the bladder to roll as will be better appreciated below.

In FIG. 19, there is illustrated in detail the girdle 242 on the outer wall 244 prior to vulcanizing, there being provided additional gum plies 245 of various lengths to form the girdle 242. In addition, the radially inner half of the outer wall 244 preferably is provided with an anti-stick surface 246 to prevent any tendency of the carcass plies to stick to the bladder, especially after the tire construction is completed and the push-up bladder is being collapsed prior to removing the tire from the drum. Such an anti-stick surface 246 may be provided for example by slightly roughening or knurling the outer surface of the bladder or by using anti-stick synthetic materials.

With the foregoing inner and outer bladder constructions, the bladders may be connected to and axially located on their annular support by the inserts and fittings which further provide the air passages for inflation of the bladders. Upon inflation, the bladders will assume a circular condition symmetrical with their respective cinch bands, but for any interference between the bladders or with the tire building drum. It will be appreciated that the bladders will be held by the cinch bands in circumferential alignment from one fitting to another and that serpentining of the bladders, i.e. bowing of the bladders inner wall between insert mounting points, will be substantially reduced or eliminated because of the inextensible cinch band which in turn is axially located by the inserts. Moreover, the resultant bladder forces act towards the tire building drum and bead such that significantly less air pressure is required. It has been found that the air pressure can be reduced 25-50% while still obtaining desired turning and stitching forces. Since less air pressure is required, bladder life is increased and overall energy efficiency of the machine is improved.

After vulcanizing, the girdle 242 will have smooth transitional annular edges 256 and 258 seen in FIG. 15. The location of the girdle 242 relative to the bead ring during the turn-up operation preferably is such that the radially inner edge 256 of the girdle will engage the bead at about 12 to 2 o'clock of the bead center and extend therebeyond at least the width of the folded over portion of the tire plies. Accordingly, for high crown tire beads, the inner girdle edge 256 is located further axially outwardly than would be used for low crown tire beads. Thus, for example, in a bladder for use with tire having a 14 inch nominal bead diameter, the inner edge of the girdle will begin about 3.5 inches from the insert 230 for a low crown bead while about 4.5 inches for a high crown bead. Customarily, a high crown bead is that where the bead width and height together are greater than $1\frac{1}{2}$ inch and a low crown bead is that where the combined bead width and height is less than $1\frac{1}{2}$ inch. In either the low or high crown type bladder, the girdle may extend to about $8\frac{1}{2}$ inches from the bladder insert.

The bladder 202 also may be provided with reinforcing cord fabric band substantially centered to the inserts 230 with one end thereof extending slightly into the girdle 242. The cords of the band are aligned axially to resist axial stretching of the bladder which otherwise may destroy the proper dimensional relationship between the girdle and the folded ply and tire bead.

During the turn-up operation, the extra thickness girlde 242 being more rigid than the adjacent portions of the bladder, has been found to act as a contracting band to cause the outer bladder to roll, i.e., to move tangentially, when acted upon by the inner bladder. As a result, such bladder construction has been found less likely to snap the plies over upon themselves which may otherwise get air entrapped in the folded bead. The amount of bladder travel is determined by the girdle width.

Modified Support Can (FIGS. 20-23)

Turning now to FIGS. 20-23, there is shown a modified embodiment of bladder support can 270 which may be substituted for the above described support can 102. In this embodiment, the support can 270 includes a support ring 272 which has a radially inwardly extending mounting flange 274 adapted for connection to the shaft assembly of a tire building machine. The radially outer surface of the ring is radially stepped forming outer and inner steps 276 and 278 concentric with the ring axis 280 on which the outer and inner bladders may be respectively mounted. The offset between the steps preferably is such that the outer bladder will lie essentially flat over the inner bladder.

Machined or otherwise formed in the outer and inner steps 276 and 278 are respectively circumferential grooves 282 and 284 opening radially outwardly to the steps. The grooves respectively are closed by outer band 286 and inner band 288 fitted over the respective steps and preferably then welded in place thereby to define outer and inner supply ducts 290 and 292. The outer band 286 may extend axially the width of the outer step 276 while the inner band 288 extends further axially outwardly beyond the support ring 272. As seen in FIG. 20, the outer band 286 is preferably slightly conical to fit over the outer step 276 which similarly is also slightly conical.

As best seen in FIG. 20, pressurized air is delivered to the outer duct 290 through radial port 294 and axial port 296, the latter of which is adapted to accept a terminal fitting of the air supply line of the tire building machine. It will be appreciated that the radial port 294 may be readily bored into the support ring 272 prior to fitting of the outer band 286 on the outer step 276. As best seen in FIG. 23, the inner duct 292 is connected to a source of pressurized air through axial port 298, radial port 300, and axial port 302, the latter of which is adapted for connection to the other supply line in the tire building machine. The axial port 298 may be readily bored in the support ring 272 from the axially inner side 304 thereof with a plug 306 used to close the port 298 at its blind end. The radial port 300 may be bored from the outer step outwardly from the groove 282 before fitting of the outer band 286 thereon which in turn closes the outer opening of the port 300. A plug weld 307 may also be provided in the radial port 300 at its blind end.

As seen in FIGS. 20 and 21, the outer axial face 308 of the support ring 272 is radially and axially recessed at 310 to provide flat chordal mounting surfaces 312 for mounting of fastener fittings 314 thereagainst. The threaded shanks 316 of the fittings 314 extend from the surfaces 312 through a bore 318 in the support ring, through inner duct 292, through bore 320 in inner band 288, and into threaded engagement with corresponding bladder inserts 322 of bladder 324. Preferably, there are four equally spaced mounting surfaces 312 and fittings 314 for securement to the support can 270 of an inner bladder having four corresponding inserts 322. The head 326 of the fitting may be maintained in sealed contact with the mounting face by sealing washer 328. No seal need be provided at the bore in the outer ring since the bladder itself will effect a seal with the outer band surface as the same is drawn into engagement therewith upon tightening of the fitting.

Each fastener fitting 314 includes a longitudinal bore 330 in its shank 316 opening to the interior of the bladder at its outer end and at its other end to a transverse bore 332 which opens to the inner duct 292. Accordingly, the fitting, in addition to locating and securing the inner bladder to the inner step of the support can, provides fluid communication between the bladder cavity and inner duct which in turn is fluidly coupled through internal ports 298, 300 and 302 in the support ring to the corresponding supply tube of the tire building machine.

Similarly, in FIGS. 22 and 23, the axially inner face 304 of the support ring 272 can be seen to be recessed at 334 to provide flat chordal mounting surfaces 336 for mounting of fastener fittings 338 thereagainst. The fastener fittings 338 are of like construction to fittings 314 and the shanks 339 thereof extend through support ring bore 340, through outer duct 290, through outer band bore 342 and into threaded engagement with threaded insert 344 of the outer bladder 346. Preferably, the mounting surfaces and fittings 338 are diametrically spaced-apart for securement to the support can of the outer bladder 326 having two corresponding inserts 344. Each fitting 338 further includes a longitudinal bore 348 in its shank 339 opening to the interior of the bladder at its outer end and at its other end to a transverse bore 350 which opens to outer duct 290. Accordingly, fluid communication between the bladder interior and inner duct is provided, the latter in turn being in fluid communication with its corresponding supply tube of the tire building machine through ports 294 and 296.

It can now be seen that a one-piece annular support of simple construction may be provided which is suitably manifolded for delivery of inflating air to bladders mounted thereon without the use of an array of connecting tubes or the like. Moreover, the bladders may be easily and quickly mounted on or removed from the annular support.

Although the invention has been shown and described in connection with a turn-up mechanism in a tire building machine, it will be appreciated that the principles of the invention may be employed with desirable and advantageous results wherever ply or belt folding operations or the like are performed such as in other types of ply turn-ups and in belt folding mechanisms.

Other modes of applying the principles of the invention may be employed, change being made as regards the details described, provided the features stated in any of the following claims or the equivalent of such be employed.

I claim:

1. In a tire building machine, a dual bladder mechanism comprising a radially stepped annular support having inner and outer steps, said support having therein inner and outer fluid ducts respectively radially underlying said inner and outer steps, inner and outer fully molded annular bladders mounted respectively on said inner and outer steps, and inner and outer fitting means for locating and securing respectively said inner and outer bladders to their respective steps, at least one fitting means for each bladder extending into its respective fluid duct and having a fluid passage therein establishing fluid communication between said bladder and its respective fluid duct.

2. The tire building machine of claim 1 wherein when deflated, said outer bladder lies cylindrically flat over said inner bladder.

3. The tire building machine of claim 1 wherein each fluid duct extends circumferentially around said support ring, and each fitting means includes a plurality of circumferentially spaced fittings.

4. The tire building machine of claim 3 wherein each fluid duct includes a circumferential groove in its corresponding step and a band fitted over said groove to close the same to form said fluid duct.

5. The tire building machine of claim 4 wherein said band for said inner step extends axially outwardly to support said inner bladder.

6. The tire building machine of claim 3 wherein each bladder includes a plurality of internally threaded inserts therein and said fittings are externally threaded for threaded engagement with said threaded inserts.

7. The tire building machine of claim 6 wherein said inserts are integrally molded in said bladder.

8. The tire building machine of claim 7 wherein at least one of said fittings includes a longitudinal bore opening to the interior of its corresponding bladder and a transverse bore opening to its corresponding fluid duct.

9. The tire building machine of claim 7 wherein said annular support is radially inwardly recessed at its axial faces to provide chordal mounting flats for said fittings.

10. The tire building machine of claim 1 wherein said annular support is a one-piece construction and includes a radially inwardly extending mounting flange at its inner diameter adapted for mounting said assembly in the tire building machine.

11. The tire building machine of claim 10 wherein said top step is conical and said bottom step is cylindrical.

12. The tire building machine of claim 3 wherein at least one of said fittings is blind.

13. The tire building machine of claim 12 wherein said fittings are spaced at most 90° apart.

14. The tire building machine of claim 13 wherein said outer bladder includes molded in mounting inserts for connection to said fittings and said fittings are spaced at most 180° apart.

15. The tire building machine of claim 3 wherein said inner bladder includes inserts for connection to said fittings.

16. The tire building machine of claim 15 wherein one fitting is live and one is blind.

17. The tire building machine of claim 15 wherein alternate fittings are live and alternate fittings are blind.

18. The tire building machine of claim 3 wherein each bladder includes a plurality of inserts for connection to said fittings and a reinforcing cinch running through said inserts.

19. The tire building machine of claim 18 wherein said cinch includes a hole for said inserts.

20. The tire building machine of claim 18 wherein said cinch and inserts are molded into said bladders.

21. The tire building machine of claim 18 wherein said cinch provides a circular band at the radial inner wall of each bladder of reduced modulus of elasticity.

22. The tire building machine of claim 1 wherein said bladders are fully molded in closed circular shape.

23. The tire building machine of claim 22 wherein said bladders are formed from an elastomeric material having a durometer hardness of Shore 50 + or −5.

24. The tire building machine of claim 22 wherein said bladders are formed from an elastomeric material having a durometer hardness of Shore 60 + or −5.

25. For use in a bladder turn-up for a tire building machine, a contour molded annular inflatable turn-up bladder, a plurality of annularly spaced inserts imbedded in the radially inner wall of said bladder for connecting and positioning said bladder in the turn-up, and a non-extensible stabilizing band imbedded in said inner wall and extending parallel to the bladder axis, said stabilizing band being located at said inserts.

26. The bladder of claim 25 wherein said stabilizing band has a plurality of openings therein through which said inserts project.

27. The bladder assembly of claim 25 wherein said stabilizing band comprises a metal band.

28. The bladder assembly of claim 27 wherein said metal band has a folded edge for strengthening the same.

29. The bladder assembly of claim 25 wherein said stabilizing band comprises a square woven band of nylon fabric.

30. The bladder assembly of claim 29 wherein one of the filler and warp directions of said fabric extend perpendicularly to the bladder axis and the other parallel to such axis.

31. The bladder assembly of claim 25 wherein said stabilizer band comprises a metal mesh.

32. The bladder assembly of claim 25 comprising two radially spaced stabilizer bands imbedded in said bladder.

33. The bladder assembly of claim 32 wherein said inserts each include a projecting flange extending between said spaced stabilizer bands interlocking said insert in said bladder.

34. The bladder assembly of claim 33 wherein each insert is chamfered at its radially outermost edge.

35. The bladder assembly of claim 34 wherein each insert has an internally threaded bore.

36. The bladder assembly of claim 34 wherein each insert comprises internally threaded metal inserts.

37. The bladder assembly of claim 25 wherein the radially outer wall of said bladder is thickened over a portion thereof to form an annular girdle.

38. The bladder assembly of claim 37 wherein the axially inner edge of said girdle is positioned to engage the tire bead at about 12:00 to 2:00 of the bead center.

39. The bladder assembly of claim 25 wherein said stabilizing band is formed from a two-ply bias fabric.

40. A dual bladder turn-up for a tire building machine comprising a stepped cylindrical support, an outer fully enclosed bladder mounted on the top step, and an inner fully enclosed bladder mounted on the bottom step relatively close to the step and when deflated, the outer bladder lying cylindrically flatly over the inner bladder, each bladder including a circular cinch with fittings therein projecting through the support, means axially to reciprocate the support and thus the bladders to a position underlying the edge of a tire building drum when deflated, a finger ply-down and bead setter movable axially of said drum edge first to fold the ply over the edge of the drum and then to set the bead against the folded ply, means to retract the bead setter and ply down clear of the bladders, and means to inflate such bladders to tend to achieve a circular condition tangent to said circular cinches, the outer bladder but for the drum and plies, and the inner bladder but for the outer bladder to cause the outer bladder to wrap and tightly stitch the plies around the bead.

41. An axially reciprocating dual bladder ply bead wrapping and stitching assembly for a tire building machine, a radially stepped cylindrical support, an outer fully molded circular bladder mounted on the top step, and an inner fully molded circular bladder mounted on the bottom step, and when deflated the outer bladder lying cylindrically flatly over the inner bladder, fittings securing said bladders to said support, and means to inflate said bladders through said fittings to tend to bring said bladders to a circular condition symmetrical with the respective fittings, but for the interference between the bladders, to cause the outer bladder to wrap and stitch the ply of a green tire about the bead.

42. A dual bladder mechanism comprising an annular support having radially offset bladder support annuli extending in opposite axial directions, inner and outer bladders mounted respectively on the inner and outer annuli, each bladder being fully molded into an endless tube and including at its I.D. at least one insert integrally molded therein, said annuli each including a locating hole corresponding to said insert of its respective bladder, and a fitting extending through each hole into engagement with each insert for securing said bladders to their respective annulus, each fitting have a fluid passage therein for inflating said bladders.

43. The mechanism of claim 42 wherein said inserts are internally threaded and said fittings are externally threaded.

44. The mechanism of claim 43 comprising a nut threaded on each externally threaded fitting and tightenable against the underside of its respective annulus.

45. The mechanism of claim 42 wherein said annular support includes a plurality of ports therein for establishing fluid communication between said fitting and a source of pressurized air.

* * * * *